United States Patent [19]
Olsen et al.

[11] Patent Number: 6,104,145
[45] Date of Patent: Aug. 15, 2000

[54] METHOD OF DC OPERATION OF A DISCHARGE LAMP WITH ARC STABILIZATION

[75] Inventors: Joseph A. Olsen, Rockport; Warren P. Moskowitz, Ipswich, both of Mass.

[73] Assignee: Osram Sylvania Inc., Danvers, Mass.

[21] Appl. No.: 09/112,128

[22] Filed: Jul. 8, 1998

[51] Int. Cl.[7] .................................................. H05B 37/02
[52] U.S. Cl. ...................... 315/246; 315/287; 315/DIG. 7
[58] Field of Search .................................... 315/246, 291, 315/307, 224, DIG. 7, 287

[56] References Cited

U.S. PATENT DOCUMENTS

| | | | |
|---|---|---|---|
| 4,983,889 | 1/1991 | Roberts | 315/246 |
| 5,047,695 | 9/1991 | Allen et al. | 315/291 |
| 5,121,034 | 6/1992 | Allen et al. | 315/246 |
| 5,134,345 | 7/1992 | El-Hamamsy et al. | 315/248 |
| 5,198,727 | 3/1993 | Allen et al. | 315/291 |
| 5,214,355 | 5/1993 | Nilssen | 315/219 |
| 5,306,987 | 4/1994 | Dakin et al. | 315/248 |
| 5,382,881 | 1/1995 | Farkas et al. | 315/307 |
| 5,391,966 | 2/1995 | Garrison | 315/308 |
| 5,475,284 | 12/1995 | Lester et al. | 315/209 R |
| 5,581,161 | 12/1996 | Gong | 315/307 |
| 5,684,367 | 11/1997 | Moscowitz et al. | 315/246 |
| 5,923,128 | 7/1999 | Canova | 315/291 |
| 5,925,985 | 7/1999 | Zeng et al. | 315/224 |

*Primary Examiner*—David Vu
*Attorney, Agent, or Firm*—Carlo S. Bessone

[57] ABSTRACT

An AC discharge lamp having a constricted arc, and powered through a unidirectional ballast with a unidirectional current, is described. The AC lamp operates as a DC lamp. One method of achieving the constriction of the arc of this lamp is to modulate the DC input power to the discharge lamp to reduce the adverse effects of DC operation. The mechanism mixes the chemicals with an acoustically induced flow.

3 Claims, 3 Drawing Sheets

METHOD OF DC OPERATION OF A DISCHARGE LAMP WITH ARC STABILIZATION

FIELD OF THE INVENTION

The present invention relates to High Intensity Discharge (HID) lamps and, more particularly, to an AC discharge lamp having a constricted arc and powered through a unidirectional current ballast with stabilization to eliminate cataphoretic effects.

BACKGROUND OF THE INVENTION

During DC operation of a High Intensity Discharge lamp, it is often noticed that without stabilization of the arc, the anode tends to overheat. This is due to the collection of energy from the incoming electrons. Other cataphoretic problems that have been reported during operation with unidirectional current include damage to the anode, wall blackening, chemical separation, color separation, and shortened operating life of the lamp.

To prevent these problems from occurring, one method embodiment of the present invention introduces a lamp-shorting pulse to modulate the power waveform. The modulated waveform creates conditions, which overcome the cataphoretic forces on the easily ionized atoms. In addition to correcting the detrimental cataphoresis and anode overheating effects during operation, the inventive method also corrects for convective forces by operating in a constrictive mode. These corrections allow the lamp to be operated in either a vertical or a horizontal burning position without adverse arc bowing effects.

The method of this invention modulates the input power to a HID lamp. This modulation eliminates DC cataphoretic effects. A unidirectional power waveform is utilized in which the amplitude is modulated, e.g., with a lamp shorting pulse. In addition, this invention utilizes unidirectional current ballasts which can be produced with fewer components with simplified topologies, and at a lower cost.

The chemical species separation and, therefore, color separation of a typical 100 watt metal halide (MH) lamp is normally very apparent after only a few minutes of standard DC operation. With the modulation method of this invention, color distortion is not noticeable even after several hours of operation.

DISCUSSION OF RELATED ART

Traditionally, ballasts and lamps have been designed to eliminate DC components of the current to avoid the adverse effects of DC operation. Previous solutions for discharge lamps operating in a DC mode can be categorized as follows.

(1) Lamps and optical systems have been specially designed to mask the adverse effects of DC operation.
(2) The color separation effect has been claimed as a benefit.
(3) Masks have been used in eliminating the radiation from a separated component.
(4) Magnetic fields and physical baffles have been used to remix the chemicals which have separated.

Although acoustic modulation, per se, does not solve the adverse effects of DC operation, the technique is mentioned herein to provide a proper understanding of the problem. The inventors have incorporated the discovery that constriction mode operation is a viable way to eliminate cataphoretic effects.

In U.S. Pat. No. 5,475,284, issued to Lester et al, on Dec. 12, 1995 for BALLAST CONTAINING CIRCUIT FOR MEASURING INCREASE IN DC VOLTAGE, a circuit is illustrated for reducing DC components in AC ballasts. The circuit is designed to reduce adverse DC effects in fluorescent lamps.

Discharge lamps have been operated in standard DC mode in the past. Such a lamp is illustrated in U.S. Pat. No. 5,391,966, issued to Garrison on Feb. 21, 1995, for STARTING AND OPERATING CIRCUIT FOR ARC DISCHARGE LAMP. Numerous methods are discussed therein for operating fluorescent, mercury vapor, sodium, and MH lamps in DC mode. Power modulation for creating acoustic pressure waves to reduce cataphoresis and anode overheating is not mentioned, however, nor is arc centering or stabilization.

In U.S. Pat. Nos. 5,047,695, and 5,198,727, issued to Allen et al, on Sep. 10, 1991 and Mar. 30, 1993, respectively, a method and a circuit are illustrated for operating MH lamps in DC mode. Although power modulation for creating acoustic pressure waves for arc straightening is mentioned, power modulation for creating acoustic pressure waves to reduce cataphoresis and anode overheating are not. In fact, in U.S. Pat. No. 5,047,695, cataphoretic effects are specifically credited with providing a less distracting forward beam. U.S. Pat. No. 5,198,727 teaches that the reduction of cataphoresis may be achieved through a horizontal magnetic field. Centering techniques are disclosed in which centering can result from acoustic perturbations that compel gas or vapor movement patterns in the fill. The centering counters gravity-induced convection.

Centering and stabilization techniques have been disclosed in the recent past. In U.S. Pat. No. 5,134,345, issued to El-Hamamsy et al, on Jul. 28, 1992, for FEEDBACK SYSTEM FOR STABILIZING THE ARC DISCHARGE OF A HIGH INTENSITY DISCHARGE LAMP, a feedback system is depicted for avoiding destabilizing acoustic frequencies. The feedback system detects arc instabilities and changes the drive frequencies.

In U.S. Pat. No. 5,306,987, issued to Dakin et al, on Apr. 26, 1994, for ACOUSTIC RESONANCE ARC STABILIZATION ARRANGEMENT IN A DISCHARGE LAMP, a stabilization method is shown for stabilizing high frequency and microwave lamps. The lamps are modulated with acoustic resonant band frequencies. This patent, however, does not address operating the lamp with standard DC.

In U.S. Pat. No. 5,581,161, issued to Gong on Dec. 3, 1996, for DC COUPLED ELECTRONIC BALLAST WITH A LARGER DC AND SMALLER AC SIGNAL, a fluorescent ballast is shown, that uses a small amount of alternating current to improve the performance of the lamp. Using alternating current for metal halide lamps, however, has been found to provide little improvement for the deleterious cataphoretic effects and over-heating phenomena that currently exist in these lamps. The effect of AC current on DC operation of metal halide lamps, has been found to be insufficient in mixing the chemicals that have separated by cataphoresis. Specifically, constriction mode of operation is needed to fully eliminate the cataphoretic effects.

In U.S. Pat. No. 4,983,889 issued to Roberts in 1989, for DISCHARGE LAMP USING ACOUSTIC RESONANT OSCILLATIONS TO ENSURE HIGH EFFICIENCY, a lamp operating with AC current, is illustrated. It is suggested therein, that acoustic frequencies can be used to mix ingredients, but like Gong above, lacks the ability to mix cataphoretically separated chemicals in DC operating metal halide lamps.

SUMMARY OF THE INVENTION

In accordance with the present invention, there is provided an AC discharge lamp having a constricted arc and powered through a unidirectional ballast with a unidirectional current. The AC lamp operates as a DC lamp. One method of achieving constriction of the arc is to modulate the DC input power to the discharge lamp to reduce the adverse effects of DC operation. The mechanism mixes the chemicals with an acoustically induced flow.

It is an object of this invention to provide an improved method of operating an AC discharge lamp with unidirectional current.

It is another object of the invention to provide an AC discharge lamp operating with unidirectional current that is substantially free of cataphoretic effects.

BRIEF DESCRIPTION OF THE DRAWINGS

A complete understanding of the present invention may be obtained by reference to the accompanying drawings, when considered in conjunction with the subsequent detailed description, in which.

For purposes of clarity and brevity, like elements and components will bear the same designations and numbering throughout the figures.

DESCRIPTION OF THE PREFERRED EMBODIMENT

Generally speaking, the invention utilizes a typical 100 watt metal halide lamp. The operational method of the invention visibly eliminates the detrimental cataphoretic effects occasioned by operating an AC lamp with unidirectional current. Potential products include small, cheap DC ballasts, optimized DC lamp and ballast combinations, universal operation of compact HID lamps and, specifically, metal halide track lighting.

Figure 1:
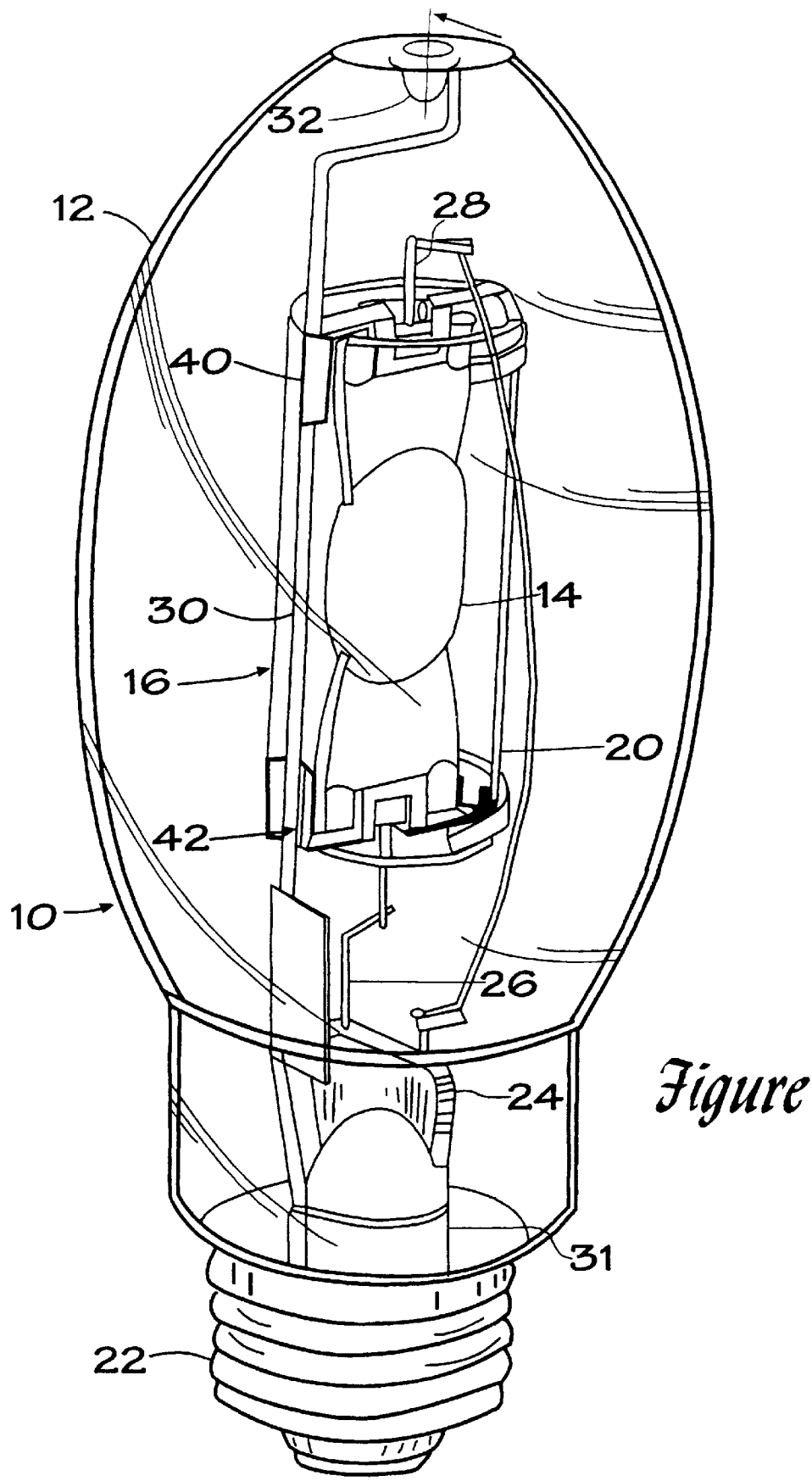
FIG. 1 illustrates a perspective view of a typical high intensity discharge lamp utilized in this invention.

Now referring to FIG. 1, a typical discharge lamp 10 is illustrated that can be used in accordance with this invention. This high intensity discharge lamp 10 includes an outer jacket 12 that is constructed of glass. Within the outer jacket 12 is disposed an arc tube 14. The arc tube 14 may be surrounded by a shroud 20 of any suitable material. The arc tube is filled with gases and/or substances, such as metal halides, that will form a high intensity light discharge when electrically excited. The lamp used in this invention is typically an OSRAM SYLVANIA MP100 Metalarc® lamp.

The arc tube 14 is held in place within the outer jacket 12 by means of a mounting support 16 that also encompasses the shroud 20. Electrical power input is fed to the arc tube 14 via base 22, a lamp stem 24 and electrical leads 26 and 28. The mounting support 16 includes a metal support rod 30 that is attached to the lamp stem 24 via strap 31. The support rod 30 also engages a protuberance 32 that projects inwardly from the top of the outer jacket 12. The central portion of the support rod 30 is substantially parallel to a vertical axis running through the arc tube 14 and the shroud 20. Respective clips 40 and 42 further act to support the rod 30 with respect to the arc tube 14 and shroud 20. The clips 40 and 42 are each welded to rod 30. A more detailed description of the materials and fabrication of the discharge lamp 10 can be found in U.S. Pat. No. 5,270,608, the pertinent teachings of which are incorporated herein by reference.

Figure 2:
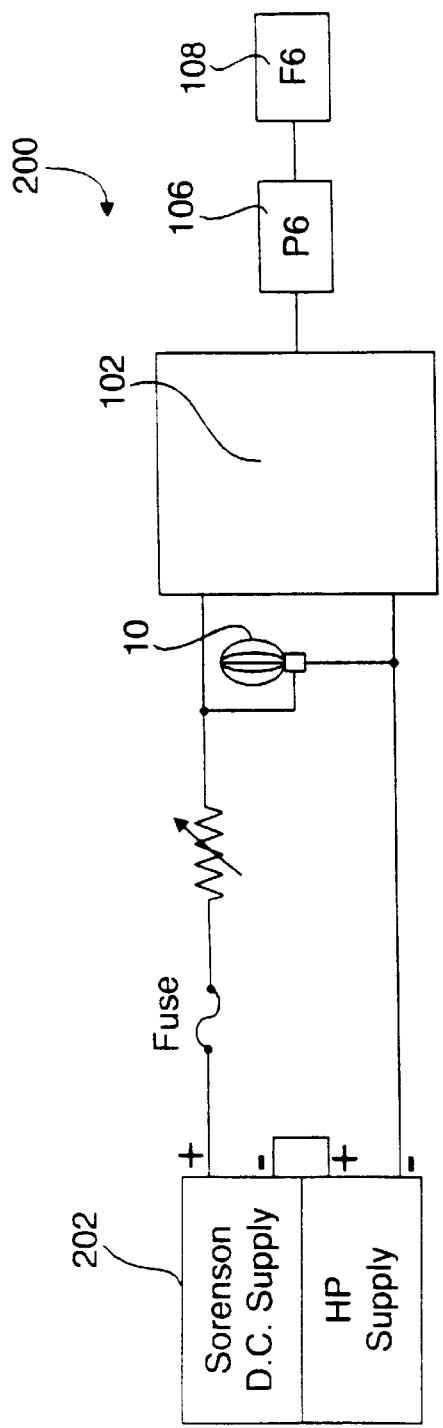
FIG. 2 illustrates a schematic circuit of the lamp depicted in FIG. 1, operating with unidirectional current in constriction mode (i.e., with a straightened and constricted arc)
Figure 3:
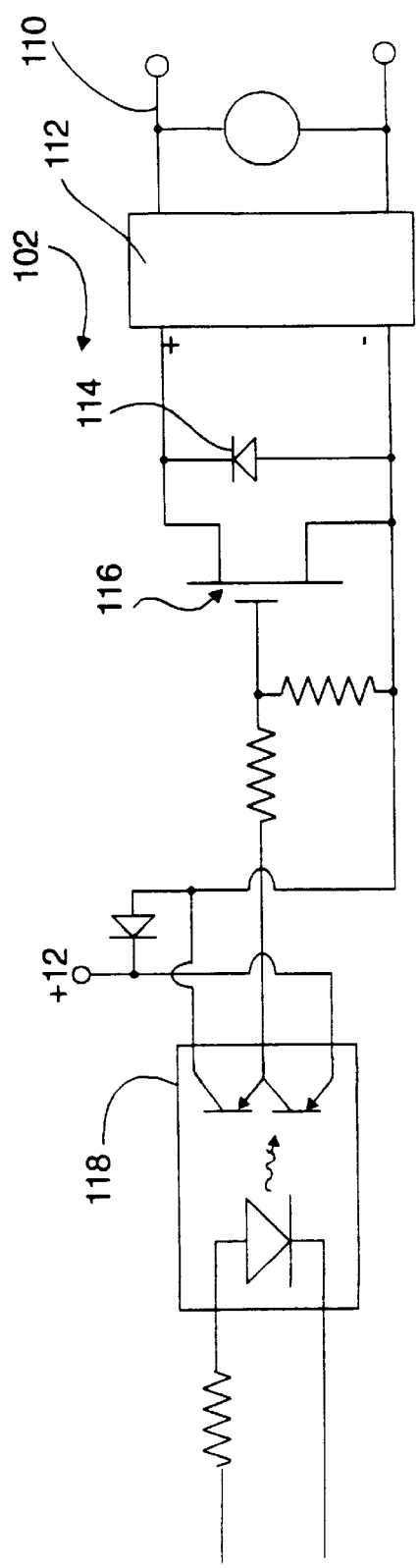
FIG. 3 shows a block diagram for the shorting circuit illustrated in FIG. 2.

Referring to FIG. 2, a circuit 200 is shown for operating the lamp 10 in the arc straightened and constriction mode utilizing the shorting circuit 102, illustrated in FIG. 3. A DC power supply 202 is used in series with the non-inductive lamp ballast resistor 204 in order to operate the lamp 10 with unidirectional current.

Acoustic frequencies are introduced into the power of the lamp 10 by periodically shorting the lamp with lamp shorting circuit 102. With the lamp running horizontally, straightening and constricting the arc is achieved by sweeping the lamp at a 1 kHz sweep rate, with frequencies used in operating this type of lamp, which are typically between 40 kHz and 50 kHz, for a sine wave, amplitude modulated, power input. The function generator 208 produces asymmetric logic pulses of approximately 10% duty cycle.

Referring to FIG. 3, the shorting circuit 102 is illustrated in greater detail. The circuit 102 uses TTL logic. The output terminals 110 are rectified across their + and − terminals by a full wave rectifier 112. When the transistor (MOSFET or IGBT) 116 is in the "off" state, the terminals are essentially open; when the transistor 116 turns "on", and the voltage across the output terminals is the voltage of the diode rectifier 112 (approx. 1.2 v), the output is a low impedance (shorted). The rectifier 112 allows the circuit to function bidirectionally with only one transistor 116. An optically isolated driver 118 protects the logic input from any power spikes.

Figure 4:
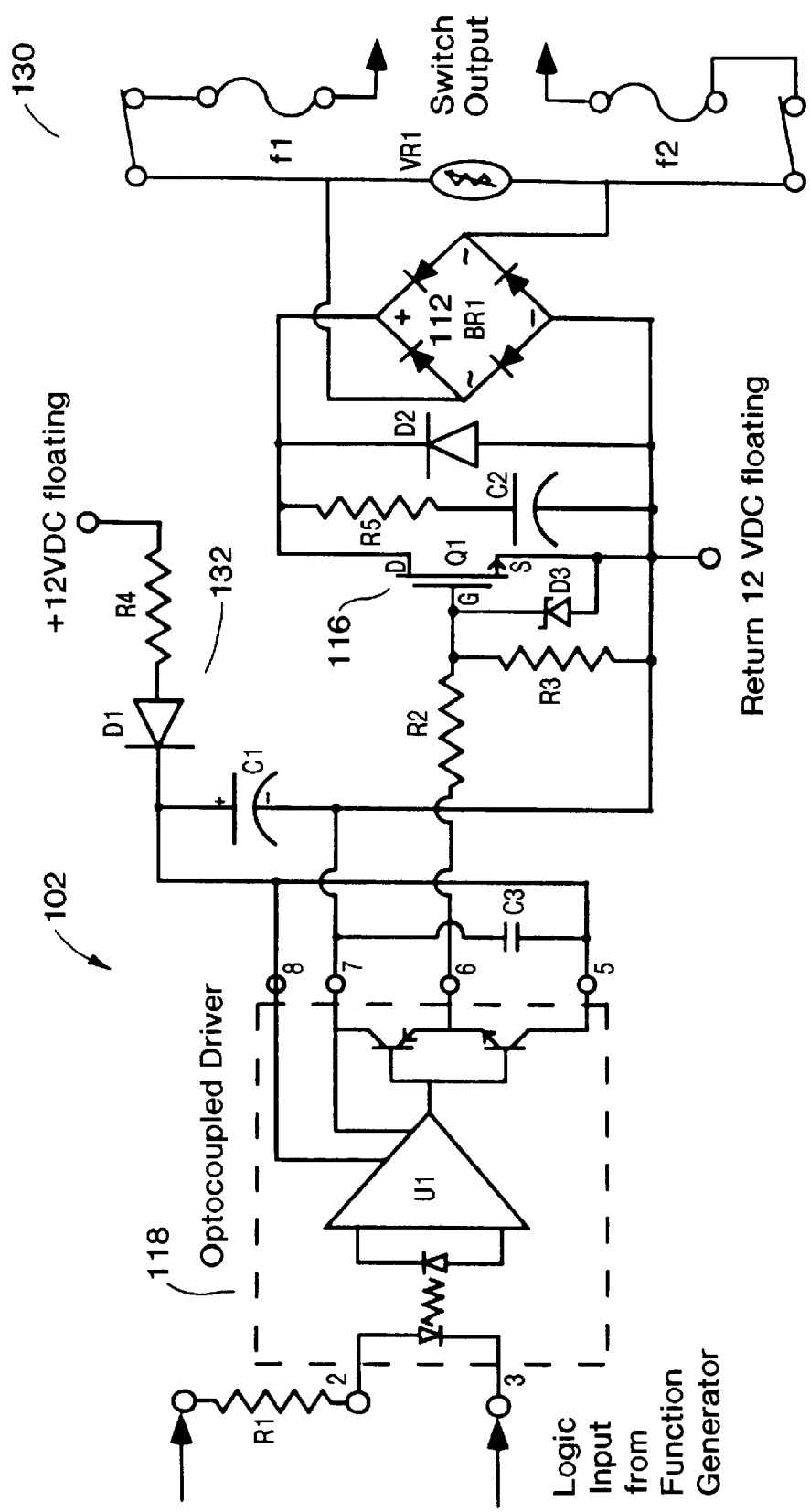
FIG. 4 is a circuit diagram of a specific embodiment of the present invention.

As shown in the embodiment of FIG. 4, a varistor VR1 and fast blow fuses F1 and F2 located in protection 130 which protects the transistor 116, as well as, snubber circuit 114 consisting of a resistor R5 and a capacitor C2. A diode D2 located across the output of transistor Q1 protects the gate of transistor Q1 from fast reverse direction voltages spikes. A diode D3 connected across the gate and source of transistor Q1 protects the gate of transistor 116 from over voltage. A pair of resistors R2 and R3 softens the drive pulse from the optocoupled driver 118. A 12 VDC floating supply along with a resistor R4, a diode D1 and a capacitor C1 provide a charge pump power source 132 for optocoupled driver 118. The shorting circuit 102 is connected into the circuit 200 (FIG. 2) after the lamp 10 is turned on.

As a specific example but in no way to be construed as a limitation, the following components are appropriate to an embodiment of the present disclosure, as illustrated in FIG. 4:

| Item | Description | Value |
| --- | --- | --- |
| R1 | Resistor | 240 ohm, ¼W |
| R2 | Resistor | 100 ohm, ¼W |
| R3 | Resistor | 1K ohm, ¼W |
| R4 | Resistor | 10 ohm, ¼W |
| R5 | Resistor | 110, 2 W |
| D1 & D2 | Diodes | MUR8100 |
| D3 | Diode (Zener) | 18 V |
| BR1 | Bridge Rectifier | RS404L |
| VR1 | Varistor | 420L20 |
| C1 | Capacitor | 100 $\mu$F, 50 V |
| C2 | Capacitor | 100 pF |
| C3 | Capacitor | 0.1 $\mu$F (ceramic) |

-continued

| Item | Description | Value |
| --- | --- | --- |
| Q1 | Transistor | (IGBT) IRGPH40F |
| U1 | Integrated Circuit | HP3101 |
| F1 & F2 | Fast Blow Fuses | 5A |

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An AC discharge lamp having a constricted arc, and powered through a unidirectional ballast with a unidirectional current, said AC discharge lamp operating with reduced cataphoretic effects, said AC discharge lamp further comprising a shorting circuit to modulate unidirectional power to the lamp operatively connected to said discharge lamp for providing straightening and constriction of said arc.

2. A method of operating an AC discharge lamp with unidirectional current without substantial cataphoretic effects, comprising the steps of:

a) operating an AC high intensity discharge (HID) lamp with a unidirectional current; and b) providing a shorting circuit to modulate unidirectional power to the lamp operatively connected to said discharge lamp for straightening and constricting an arc of said HID lamp to substantially eliminate cataphoretic effects.

3. An AC high intensity discharge (HID) lamp having a constricted arc, and powered through a unidirectional ballast with a unidirectional current, said AC discharge lamp operating with reduced cataphoretic effects, said AC discharge lamp further comprising a shorting circuit to modulate unidirectional power to the lamp operatively connected to said discharge lamp for providing straightening and constriction of said arc.

* * * * *